United States Patent
Velasco

(10) Patent No.: US 11,014,675 B2
(45) Date of Patent: May 25, 2021

(54) LIGHTWEIGHT UPHOLSTERY COVER WITH EDGE ATTACHMENT

(71) Applicant: Howard Velasco, Bristol, CT (US)

(72) Inventor: Howard Velasco, Bristol, CT (US)

(73) Assignee: FRANKLIN PRODUCTS, INC., Torrington, CT (US)

( * ) Notice: Subject to any disclaimer, the term of this patent is extended or adjusted under 35 U.S.C. 154(b) by 0 days.

(21) Appl. No.: 14/677,549

(22) Filed: Apr. 2, 2015

(65) Prior Publication Data

US 2015/0284093 A1    Oct. 8, 2015

Related U.S. Application Data

(60) Provisional application No. 61/974,704, filed on Apr. 3, 2014.

(51) Int. Cl.
*B64D 11/06* (2006.01)
*B60N 2/58* (2006.01)

(52) U.S. Cl.
CPC ........ *B64D 11/0647* (2014.12); *B60N 2/5825* (2013.01); *B60N 2/5841* (2013.01); *B60N 2/5891* (2013.01); *Y10T 29/481* (2015.01)

(58) Field of Classification Search
CPC .. B60N 2/5816; B60N 2/5841; B60N 2/5858; B60N 2/5825; A47C 31/023; A47C 31/06
See application file for complete search history.

(56) References Cited

U.S. PATENT DOCUMENTS

| 1,515,711 | A | * | 11/1924 | Van Hove | B60N 2/7041 |
| | | | | | 296/135 |
| 1,962,215 | A | * | 6/1934 | Sallop | B60N 2/5816 |
| | | | | | 297/226 |
| 2,252,970 | A | * | 8/1941 | Gedris | A47C 7/40 |
| | | | | | 297/450.1 |

(Continued)

FOREIGN PATENT DOCUMENTS

| EP | 0 318 346 A1 | 5/1989 |
| EP | 2583862 A1 | 4/2013 |

(Continued)

OTHER PUBLICATIONS

International Search Report for PCT/US2015/032377 dated Nov. 26, 2015.

(Continued)

*Primary Examiner* — David R Dunn
*Assistant Examiner* — Christopher E Veraa
(74) *Attorney, Agent, or Firm* — McCormick, Paulding & Huber PLLC

(57) ABSTRACT

An upholstery cover article comprises a pad; a facing laminated to one side of the pad; a backing scrim laminated to the other side of the pad opposite the fabric cover; and an edge attachment article secured to a perimeter of at least one of the pad, the facing, or the backing scrim. The edge attachment article consists essentially of a ribbon of spring material, which is formed to provide a securement portion that is secured along the perimeter of the flexible panel, and to provide an catch portion that is not secured to the flexible panel and protrudes contiguous from the securement portion partway across the flexible panel.

21 Claims, 3 Drawing Sheets

(56) References Cited

U.S. PATENT DOCUMENTS

| | | | | | |
|---|---|---|---|---|---|
| 2,608,243 | A | * | 8/1952 | Kostrowski | A47C 31/026 297/218.3 |
| 2,612,941 | A | * | 10/1952 | Naughton, Jr. | A47C 31/02 5/194 |
| 2,876,826 | A | | 3/1959 | Neely et al. | |
| 3,127,695 | A | * | 4/1964 | Driscoll | B44D 3/185 160/378 |
| 3,589,763 | A | * | 6/1971 | Reeves | A47C 7/16 297/452.49 |
| 3,928,898 | A | * | 12/1975 | Smoot | A47C 31/023 24/532 |
| 4,057,292 | A | * | 11/1977 | Arnold | A47C 31/023 24/545 |
| 4,507,351 | A | * | 3/1985 | Johnson | B32B 5/26 156/291 |
| 4,526,420 | A | * | 7/1985 | Kawamura | A47C 31/023 297/218.1 |
| 4,872,724 | A | * | 10/1989 | Deley | A47C 31/023 160/DIG. 15 |
| 5,395,473 | A | * | 3/1995 | Nixon | B29C 63/22 156/285 |
| 6,632,756 | B1 | * | 10/2003 | Waldrop | B32B 5/18 297/218.1 |
| 6,983,997 | B2 | * | 1/2006 | Wilkerson | A47C 1/023 297/452.13 |
| 8,240,759 | B2 | * | 8/2012 | Hobl | B60N 2/5825 297/218.1 |
| 2007/0040421 | A1 | * | 2/2007 | Zuzga | B60N 2/5657 297/180.13 |
| 2007/0200417 | A1 | * | 8/2007 | York | A47C 31/023 297/452.55 |
| 2010/0259079 | A1 | * | 10/2010 | Matsuzaki | B60N 2/5816 297/218.2 |

FOREIGN PATENT DOCUMENTS

| | | |
|---|---|---|
| GB | 1054678 A | 1/1967 |
| JP | 2009125113 A | 11/2009 |

OTHER PUBLICATIONS

Extended European Search Report for European Patent Application No. 15772995.5-1754 dated Oct. 27, 2017.

* cited by examiner

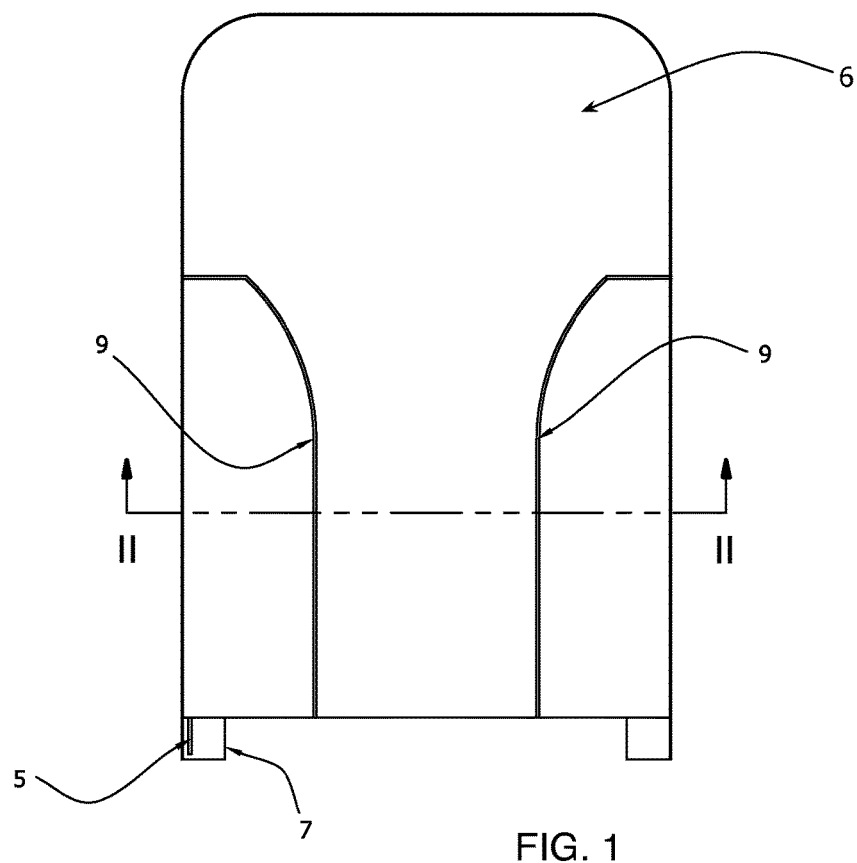
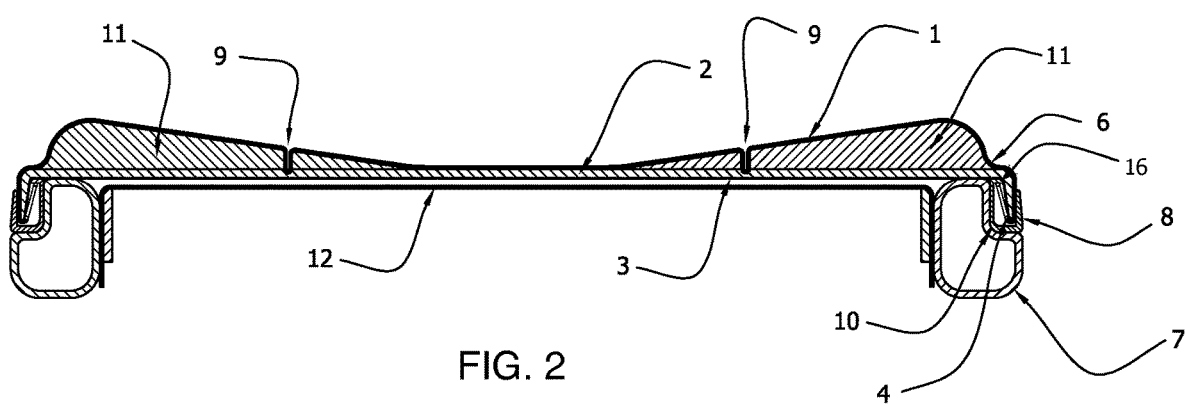

LIGHTWEIGHT UPHOLSTERY COVER WITH EDGE ATTACHMENT

CROSS REFERENCE TO RELATED APPLICATION

This is a non-provisional of, claims the benefit under 35 USC § 119(e) of, and hereby incorporates by reference U.S. Pat. App. 61/974,704 "Lightweight Dress Cover with Edge Attachment," filed Apr. 3, 2014.

BACKGROUND

Technical Field

The invention relates to upholstered furniture. Particular embodiments of the invention relate to means for attaching upholstery covers to furniture frames.

Discussion of Art

Upholstery for aircraft seating usually includes a "dress" upholstery cover that is used to provide the final layer of comfort control, feel and appearance. Such covers are made from many materials, commonly cloth fabrics, natural, reconstituted, and faux leather are used. Some include foam or other types of padding. The covers must be removable for maintenance, especially fabric ones which require dry cleaning. Dress cover design and construction varies widely depending on the seat configuration, material, design aesthetics, and acceptable cost. However, it is common for covers to be complicated to make and install. Much of the complexity stems from needing to be removable. Additional complexity arises from attempts to conform flexible covers to contoured seating surfaces.

Accordingly it is desirable to provide lightweight upholstery covers that are easily removable and installable, and that can conform to contoured seating surfaces without complex installation.

SUMMARY OF INVENTION

Embodiments of the invention provide an upholstery cover article that comprises a pad; a facing laminated to one side of the pad; a backing scrim laminated to the other side of the pad opposite the fabric cover; and an edge attachment article secured to a perimeter of at least one of the pad, the facing, or the backing scrim. The edge attachment article consists essentially of a ribbon of spring material, which is formed to provide a securement portion that is secured along the perimeter of the flexible panel, and to provide an catch portion that is not secured to the flexible panel and protrudes contiguous from the securement portion partway across the flexible panel.

Other embodiments of the invention provide an article of furniture that comprises a frame and an upholstery cover that includes at least a pad, a facing laminated to a front side of the pad, and a backing scrim laminated to the back side of the pad, with an edge attachment article secured along a perimeter of the upholstery cover, and engaged with a part of the frame for attaching the upholstery cover to the frame.

Yet other embodiments implement a method for making an upholstery cover. The inventive method comprises laying together a facing, a pad, and a backing scrim in that order, with intervening adhesive, to form a preform; pressing the preform to cure the adhesive and form the upholstery cover; and affixing around a perimeter of the upholstery cover an edge attachment article that consists essentially of a ribbon of spring material, which is formed to provide a securement portion that is secured along the perimeter of the flexible panel, and to provide an catch portion that is not secured to the flexible panel and protrudes contiguous from the securement portion partway across the flexible panel.

The varied exemplary embodiments of the invention, as briefly described above, are illustrated by certain of the following figures.

BRIEF DESCRIPTION OF DRAWINGS

FIG. 1 shows in front view a seat back assembly, which includes a laminated pad upholstery cover incorporating an edge attachment article according to an embodiment of the invention.

FIG. 2 shows a sectional view of the seat back assembly of FIG. 1.

DETAILED DESCRIPTION

Figure 3:
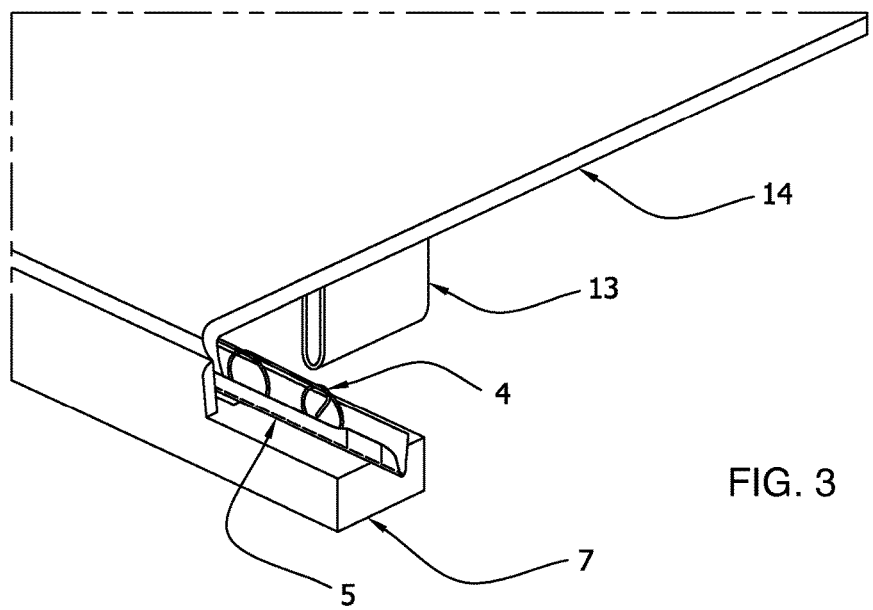
FIG. 3 shows in perspective a detail view of the seat back assembly of FIG. 1.

Although embodiments of the invention as shown in the drawings are described as relating to aircraft seating, aspects of the invention more generally may be applicable to, e.g., other types of furniture having a frame with a cover stretched over or attached to the frame.

FIGS. 1-3 show a laminated pad upholstery cover 6 that is installed onto a seat back frame 7. The cover comprises a facing 1 (e.g., woven or non-woven fabric, leather, or plastic membrane), a cushion layer or pad 2 (e.g., fire resistant polyurethane foam or fire-blocked high resilient foam), and a backing scrim 3 (e.g. a woven fabric scrim), which are laminated together (e.g., by use of an adhesive cured under heat and pressure). Optionally, the pad 2 may be made of varying thickness, or additional segments 11 of pad material may be included between the pad 2 and the facing 1, so as to provide a bolstered structure for occupant comfort. The cover 6 typically is supported by a diaphragm 12, which can be installed into the frame 7 by various modes.

The laminated pad upholstery cover can be made by placing adhesive between the layers of material 1, 2 (and 11), and 3 to form a preform, then placing the preform into a tool (not shown) that is then placed into a laminating press (not shown). The press heats and presses the tool and the preform to cure the adhesive. The tool may include strips or rules of metal to bear on areas of the preform so as to indent styling elements 9 into at least the facing 1 and the pad 2, so as to produce an embossed appearance.

The upholstery cover is installed onto the frame 7 by way of an edge attachment article 4, which is secured at an edge or perimeter 14 of the upholstery cover as shown in FIG. 2. The edge attachment article 4 may, for example, be formed as loops, closed loops or protruding sections of wire linked by straight sections of wire, such as illustrated in the exemplary designs provided in FIG. 4, with the loops, closed loops or protruding sections being secured to at least one layer of the upholstery cover as a securement portion 20 of the edge attachment article 4, and with the straight sections acting as a catch portion 22 of the edge attachment article 4 and being engaged with the frame 7 to hold the upholstery cover in place, as shown in FIGS. 1-3.

For installation of the edge attachment feature 4, the frame 7 includes a mating feature 8, e.g., a channel as shown in FIGS. 1-3, which may be integrally formed into the frame 7 (e.g. by form rolling or extrusion). Typically, the mating feature 8 will include a retaining element, such as a lip 16, which can engage with the catch portion 22 of the edge attachment article 4. The mating feature 8 may be installed into a recess 10 as shown in FIG. 2, or may be brazed or glued or riveted or otherwise attached onto the frame 7. The recess 10 itself can be form rolled or extruded in the frame 7.

Figure 4:
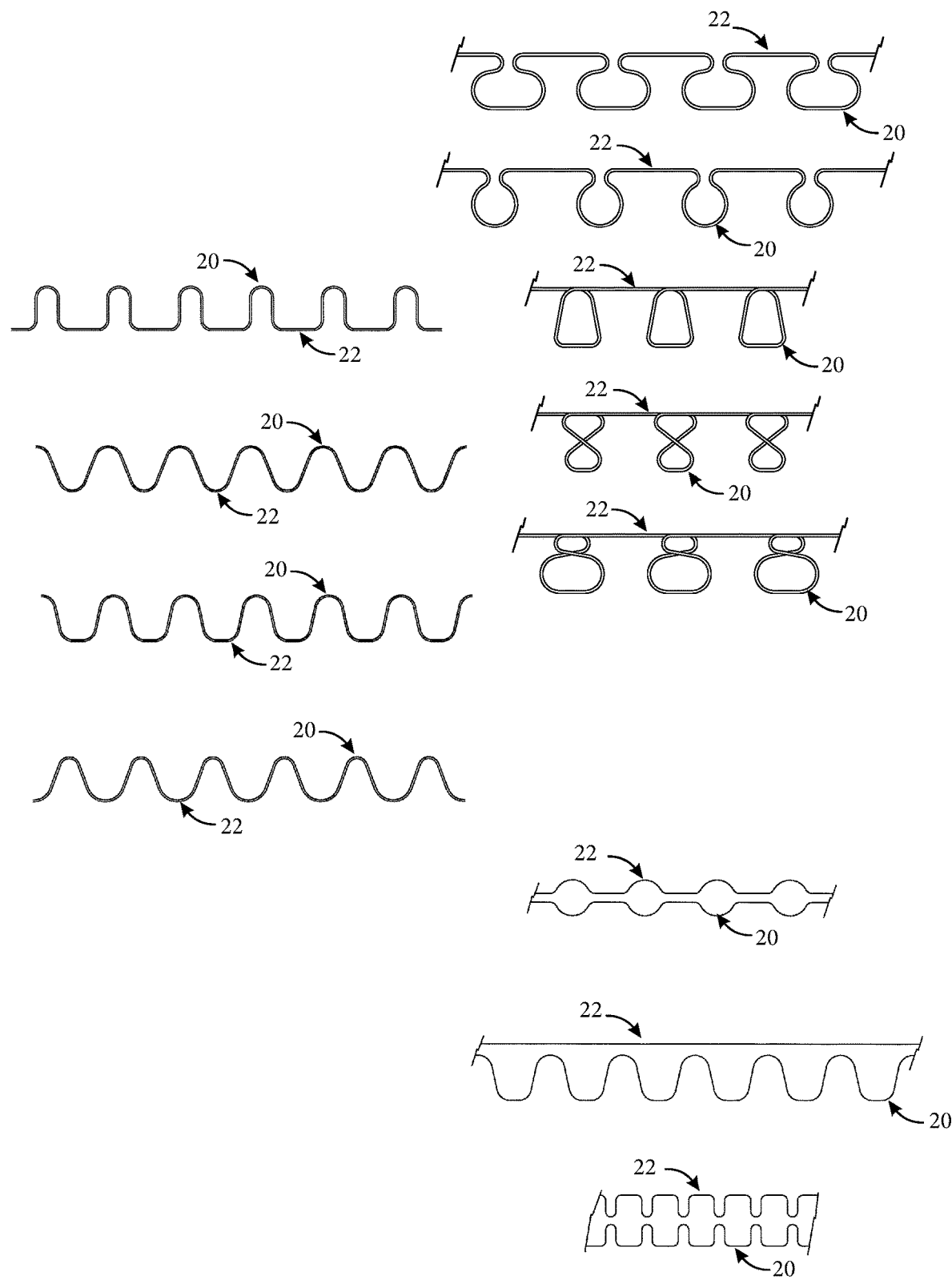
FIG. 4 shows in plan view plural alternative shapes for an edge attachment article usable in the upholstery cover of FIG. 1.

Alternatively, the edge attachment article 4 and the mating feature 8 may be of any forms that can quickly be engaged and disengaged: e.g., zippers, hook and loop fasteners, welt cords and hooks, snaps, wire hooks and grommets, or other specialized wire or plastic forms. For example, the edge attachment article 4 may have any of the shapes as shown in FIG. 4, each including a securement portion 20, defined for example, by loops, closed loops or other protrusions, and a catch portion 22, defined by straight sections or sections set apart from the securement portion 20, where the catch portion 22 is designed to engage the mating feature 8 formed into the frame 7.

In the exemplary embodiment of FIGS. 1-3, the edge attachment article 4 is sewn onto the upholstery cover along a hemmed or overcast edge 14 thereof. The edge attachment article 4 may be sewn within a folded tape, which extends beyond a corner of the upholstery cover to provide a release tab 5 that can be stowed into a pocket 13 at the edge 14 of the upholstery cover, as shown in FIG. 3. To remove the cover from the frame 7, the release tab 5 can be drawn out of the pocket 13 and used to move a small amount of the edge 14 out of the auxiliary channel 8. The edge 14 then can be gradually removed along the perimeter of the frame 7.

In some cases, mounting a upholstery cover to a frame only at its edges, as shown in FIGS. 1-3, may cause the cover to follow contours of the frame instead of the seating surface, which can cause a bridging or tenting condition to occur over limited (concave) areas of the seating surface. Sometimes these conditions are resolvable by strapping or otherwise securing the concave areas of the seating surface to the frame or to the diaphragm 12, which may be bolstered or contoured to define a concave shape behind the upholstery cover, for example as disclosed in co-pending application Ser. No. 14/244,524 "Aircraft Seat Back Assembly," filed Apr. 3, 2014.

Figure 5:
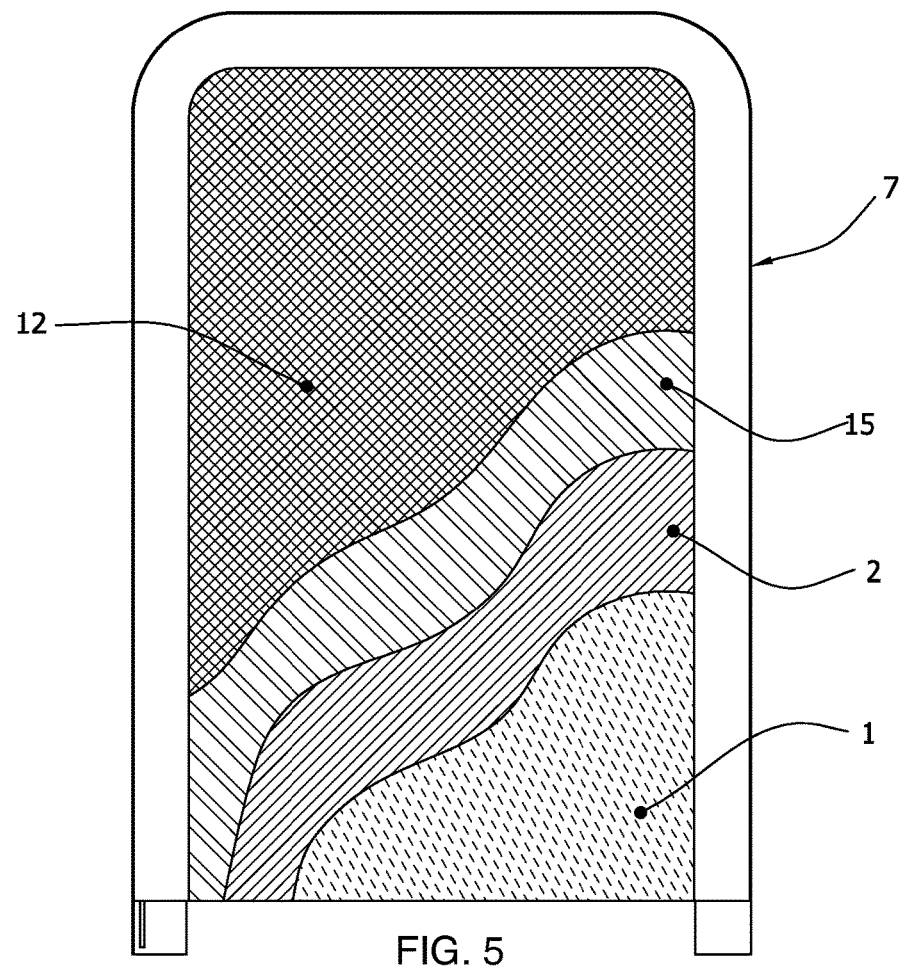
FIG. 5 shows in rear view a seat back assembly including a laminated pad upholstery cover with integrated non-woven scrim according to another embodiment of the invention.

However, tenting or bridging can be addressed without having to resort to such securements, which increase complexity of installing and removing a cover. In particular, tenting and bridging can be prevented during construction of a laminated upholstery cover, by incorporating as shown in FIG. 5 a layer of spun-bonded non-woven fabric 15 at the rear of the foam padding 2. The spun-bonded non-woven fabric 15 is shaped during adhesive cure in a lamination press, and after removing the finished upholstery cover from the lamination press, the non-woven fabric resists flattening and acts to retain the concave shape imparted by the press. The spun-bonded structure of the non-woven fabric layer 15 enables it to act as a form-shaping scrim, thereby eliminating any need for laminating a heavier woven scrim fabric.

Although exemplary embodiments of the invention have been described with reference to attached drawings, those skilled in the art nevertheless will apprehend variations in form or detail that are consistent with the scope of the invention as defined by the appended claims.

What is claimed is:

1. An upholstery cover adapted for attachment to a frame, said frame including a mating feature for receiving the upholstery cover, said upholstery cover comprising:
   a pad;
   a facing laminated to one side of the pad;
   a backing scrim laminated to the other side of the pad opposite the facing; and
   an edge attachment article secured to a perimeter of at least one of the pad, the facing, or the backing scrim, wherein the edge attachment article comprises a ribbon of spring material, which is formed to define a plurality of securement portions that are secured along at least a portion of the perimeter of the upholstery cover, and to define a plurality of catch portions that are not secured to the upholstery cover and which extend contiguous from the plurality of securement portions; said plurality of catch portions being adapted for engagement with the mating feature of the frame to which the upholstery cover is to be attached via the edge attachment article and wherein said plurality of securement portions are formed as loops projecting from the plurality of catch portions;
   wherein at least one securement portion of the plurality of securement portions and at least one catch portion of the plurality of catch portions are arranged to extend along a length of the edge attachment article in the same plane, and
   wherein the length of the edge attachment article extends in a longitudinal direction and wherein the ribbon of spring material forming the plurality of securement portions and the plurality of catch portions includes a portion that folds back on itself relative to the longitudinal direction.

2. The upholstery cover of claim 1 wherein the plurality of catch portions are formed as bends projected away from the securement portions.

3. The upholstery cover of claim 1, wherein the plurality of securement portions are formed as closed loops.

4. The upholstery cover of claim 1, wherein the plurality of securement portions are formed as twisted loops.

5. The upholstery cover of claim 1 wherein the plurality of catch portions are formed as tabs projected away from the plurality of securement portions.

6. The upholstery cover of claim 1 wherein at least a portion of the backing scrim is spun-bonded non-woven fabric and is formed in an at least partly concave shape.

7. The upholstery cover of claim 1 wherein at least the facing and the pad are indented during laminating to provide embossed features.

8. The upholstery cover of claim 1 wherein the pad is of varying thickness to provide bolstering.

9. The upholstery cover of claim 1 wherein the facing comprises at least one of woven fabric, non-woven fabric, leather, or plastic sheet.

10. The upholstery cover of claim 1 further comprising additional segments of pad material to provide bolstering.

11. The upholstery cover of claim 1, wherein each of the plurality of catch portions is a single generally straight section of the ribbon of spring material extending between the loops comprising the plurality of securement portions.

12. An upholstery cover adapted for attachment to a frame, said frame including a mating feature for receiving the upholstery cover, said upholstery cover comprising:
   a pad;
   a facing laminated to one side of the pad;
   a backing scrim laminated to the other side of the pad opposite the facing;

an edge attachment article secured to a perimeter of at least one of the pad, the facing, or the backing scrim, wherein the edge attachment article comprises a ribbon of spring material, which is formed to define a securement portion that is secured along the perimeter of the upholstery cover, and to define a catch portion that is not secured to the upholstery cover and protrudes contiguous from the securement portion partway across the upholstery cover; said catch portion being adapted for engagement with the mating feature of the frame to which the upholstery cover is to be attached via the edge attachment article and wherein said securement portion is formed as loops projecting from the catch portion; and a pocket disposed at the perimeter of the upholstery cover, wherein the edge attachment article includes a release tab stowable in the pocket.

13. An article of furniture comprising:

a frame including a mating feature; and an upholstery cover that includes at least a pad, a facing laminated to a front side of the pad, and a backing scrim laminated to a back side of the pad, with an edge attachment article secured along a perimeter of the upholstery cover and engaged with the mating feature of the frame for attaching the upholstery cover to the frame, wherein the edge attachment article includes a plurality of securement portions that are secured along at least a portion of the perimeter of the upholstery cover and a plurality of catch portions adapted for engagement with the mating feature of the frame to secure the upholstery cover in place on the frame, wherein the plurality of securement portions are formed as loops projecting from the plurality of catch portions;

wherein at least one securement portion of the plurality of securement portions and at least one catch portion of the plurality of catch portions are arranged to extend along a length of the edge attachment article in the same plane, and wherein the length of the edge attachment article extends in a longitudinal direction and wherein the ribbon of spring material forming the plurality of securement portions and the plurality of catch portions includes a portion that folds back on itself relative to the longitudinal direction.

14. The article of claim 13 wherein the mating feature comprises a lip for engaging the plurality of catch portions of the edge attachment article.

15. The article of claim 13 further comprising a diaphragm mounted to the frame adjacent the back side of the upholstery cover, for supporting the pad against an occupant's weight.

16. The article of claim 13 wherein at least a part of the backing scrim is formed of a spun-bonded non-woven fabric in an at least partly concave shape.

17. The article of claim 13, wherein each of the plurality of catch portions is a single generally straight section of the ribbon of spring material extending between the loops comprising the plurality of securement portions.

18. A method for making an upholstery cover adaptable for attachment to a frame, said frame including a mating feature for receiving the upholstery cover, said method comprising:

laying together a facing, a pad, and a backing scrim in that order, with intervening adhesive, to form a preform;

pressing the preform to cure the adhesive and form the upholstery cover; and affixing an edge attachment article around a perimeter of the upholstery cover, wherein the edge attachment article comprises a ribbon of spring material which is formed to define a plurality of securement portions that are secured along at least a portion of the perimeter of the upholstery cover, and to define a plurality of catch portions that are not secured to the upholstery cover and which extend contiguous from the plurality of securement portions, said plurality of catch portions being adapted for engagement with the mating feature on the frame to which the upholstery cover is to be attached via the edge attachment article and wherein said plurality of securement portions are formed as loops projecting from the plurality of catch portions;

wherein at least one securement portion of the plurality of securement portions and at least one catch portion of the plurality of catch portions are arranged to extend along a length of the edge attachment article in the same plane, and wherein the length of the edge attachment article extends in a longitudinal direction and wherein the ribbon of spring material forming the plurality of securement portions and the plurality of catch portions includes a portion that folds back on itself relative to the longitudinal direction.

19. The method of claim 18 further comprising indenting parts of at least the facing and the pad to form embossed features.

20. The method of claim 18 further comprising providing at least a part of the backing scrim as a spun-bonded non-woven fabric and pressing at least a part of the non-woven fabric to a concave shape.

21. The method of claim 18, wherein each of the plurality of catch portions is a single generally straight section of the ribbon of spring material extending between the loops comprising the plurality of securement portions.

* * * * *